(12) United States Patent
Livne et al.

(10) Patent No.: US 10,522,135 B2
(45) Date of Patent: Dec. 31, 2019

(54) SYSTEM AND METHOD FOR SEGMENTING AUDIO FILES FOR TRANSCRIPTION

(71) Applicant: Verbit Software Ltd., Ramat Gan (IL)

(72) Inventors: Tom Livne, Ramat Gan (IL); Kobi Ben Tzvi, Ramat Hasharon (IL); Eric Shellef, Givaatayim (IL)

(73) Assignee: Verbit Software Ltd., Tel Aviv (IL)

( * ) Notice: Subject to any disclaimer, the term of this patent is extended or adjusted under 35 U.S.C. 154(b) by 124 days.

(21) Appl. No.: 15/859,611

(22) Filed: Dec. 31, 2017

(65) Prior Publication Data

US 2018/0342235 A1    Nov. 29, 2018

Related U.S. Application Data

(60) Provisional application No. 62/510,293, filed on May 24, 2017.

(51) Int. Cl.

| | | |
|---|---|---|
| *G10L 15/00* | (2013.01) | |
| *G10L 15/04* | (2013.01) | |
| *G10L 15/16* | (2006.01) | |
| *G10L 15/18* | (2013.01) | |
| *G10L 25/48* | (2013.01) | |
| G10L 15/02 | (2006.01) | |
| G10L 17/00 | (2013.01) | |
| G10L 25/84 | (2013.01) | |

(52) U.S. Cl.
CPC .............. *G10L 15/04* (2013.01); *G10L 15/16* (2013.01); *G10L 15/1815* (2013.01); *G10L 25/48* (2013.01); *G10L 15/005* (2013.01); *G10L 15/02* (2013.01); *G10L 17/005* (2013.01); *G10L 25/84* (2013.01)

(58) Field of Classification Search
CPC ..... G10L 15/16; G10L 17/005; G06F 17/271; G06F 17/275
USPC ........................................................ 704/254
See application file for complete search history.

(56) References Cited

U.S. PATENT DOCUMENTS

| | | |
|---|---|---|
| 5,689,616 A | 11/1997 | Li |
| 7,573,904 B2 | 8/2009 | Pichna et al. |
| 7,694,128 B2 | 4/2010 | Judge et al. |
| 8,032,750 B2 | 10/2011 | Swedor et al. |
| 8,289,886 B2 | 10/2012 | McDonald et al. |
| 8,379,860 B2 | 2/2013 | Lobzakov et al. |
| 8,538,028 B2 | 9/2013 | Yeap et al. |
| 8,731,175 B2 | 5/2014 | Shaffer et al. |

(Continued)

FOREIGN PATENT DOCUMENTS

WO    WO-2014004224 A1 *    1/2014    ............ H04M 3/569

OTHER PUBLICATIONS

Liu, Minghui, etal. "A new hybrid GMM/SVM for speaker verification." 18th International Conference on Pattern Recognition (ICPR '06). vol. 4. IEEE, 2006. (Year: 2006).

(Continued)

*Primary Examiner* — Daniel Abebe
(74) *Attorney, Agent, or Firm* — Active Knowledge Ltd.

(57) ABSTRACT

A system and method for segmenting an audio file. The method includes analyzing an audio file, wherein the analyzing includes identifying speech recognition features within the audio file; generating metadata based on the audio file, wherein the metadata includes transcription characteristics of the audio file; and determining a segmenting interval for the audio file based on the speech recognition features and the metadata.

16 Claims, 3 Drawing Sheets

(56) References Cited

U.S. PATENT DOCUMENTS

| | | |
|---|---|---|
| 8,799,643 B2 | 8/2014 | Zhou et al. |
| 8,832,853 B2 | 9/2014 | Clark et al. |
| 8,862,129 B2 | 10/2014 | Moshir et al. |
| 9,191,345 B2 | 11/2015 | Dumans |
| 9,203,842 B2 | 12/2015 | Venkataramu et al. |
| 9,226,147 B2 | 12/2015 | Brander et al. |
| 9,240,999 B2 | 1/2016 | Clark et al. |
| 9,369,459 B2 | 6/2016 | Galwas |
| 9,572,033 B2 | 2/2017 | Moshir et al. |
| 2008/0255842 A1 | 10/2008 | Simhi |
| 2010/0094630 A1* | 4/2010 | Yoakum ............... G10L 15/187 704/254 |
| 2014/0108789 A1 | 4/2014 | Phatak |
| 2015/0019861 A1 | 1/2015 | Zhou et al. |
| 2015/0128205 A1 | 5/2015 | Mahaffey et al. |
| 2015/0199966 A1 | 7/2015 | Paulik et al. |
| 2015/0378382 A1 | 12/2015 | Phatak |
| 2016/0098915 A1 | 4/2016 | Phatak |
| 2016/0211976 A1 | 7/2016 | Paris et al. |
| 2016/0357979 A1 | 12/2016 | Paris et al. |
| 2016/0373263 A1 | 12/2016 | Zaidi et al. |
| 2017/0006034 A1 | 1/2017 | Charles |
| 2017/0323655 A1* | 11/2017 | Gibbon ................. G11B 27/28 |
| 2018/0336902 A1* | 11/2018 | Cartwright .......... G06F 17/2785 |

OTHER PUBLICATIONS

You, Chang Huai, Kong Aik Lee, and Haizhou Li. "GMM-SVM kernel with a Bhattacharyya-based distance for speaker recognition." IEEE Transactions on Audio, Speech, and Language Processing 18.6 (2009): 1300-1312. (Year: 2009).

* cited by examiner

SYSTEM AND METHOD FOR SEGMENTING AUDIO FILES FOR TRANSCRIPTION

CROSS-REFERENCE TO RELATED APPLICATIONS

This application claims the benefit of U.S. Provisional Application No. 62/510,293 filed on May 24, 2017, the contents of which are hereby incorporated by reference.

TECHNICAL FIELD

The present disclosure relates generally to audio transcription systems, and more specifically a system and method for assessing and segmenting audio files for transcription purposes.

BACKGROUND

Transcription in the linguistic sense is a systematic representation of language in written form. The source of a transcription can either be utterances (e.g., speech or sign language) or preexisting text in another writing system.

In the academic discipline of linguistics, transcription is an essential part of the methodologies of phonetics, conversation analysis, dialectology and sociolinguistics. It also plays an important role for several subfields of speech technology. Common examples for transcription use employed outside of academia involve the proceedings of a court hearing, such as a criminal trial (by a court reporter), a physician's recorded voice notes (medical transcription), aid for hearing impaired persons, and the like.

Recently, transcription services have become commonly available to interested users through various online web sources. Examples of such web sources include rev.com, transcribeMe®, and similar services where audio files are uploaded by users and distributed via a marketplace to a plurality of individuals who are either freelancers or employed by the web source operator to transcribe the audio file. However, it can be difficult to properly analyze an audio file in an automated fashion. These audio files are heterogeneous by nature in regard to a speaker's type, accent, background noise within the file, context, and subject matter of the audio. It is often desirable to split up audio files into multiple segments, for example based on the current speaker, general voice activity, the subject matter being discussed, and the like, in order to more easily analyze, manage, and transcribe the recorded content. Splitting a file into optimal segments often requires human involvement, which can be time consuming, inefficient and costly.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for segmenting an audio file. The method includes analyzing an audio file, wherein the analyzing includes identifying speech recognition features within the audio file; generating metadata based on the audio file, wherein the metadata includes transcription characteristics of the audio file; and determining a segmenting interval for the audio file based on the speech recognition features and the metadata.

Certain embodiments disclosed herein also include a non-transitory computer readable medium having stored thereon instructions for causing a processing circuitry to perform a process. The process includes analyzing an audio file, wherein the analyzing includes identifying speech recognition features within the audio file; generating metadata based on the audio file, wherein the metadata includes transcription characteristics of the audio file; and determining a segmenting interval for the audio file based on the speech recognition features and the metadata.

Certain embodiments disclosed herein also include a system for segmenting an audio file. The system includes a processing circuitry; and a memory, the memory containing instructions that, when executed by the processing circuitry, configure the system to: analyze an audio file, wherein the analyzing includes identifying speech recognition features within the audio file; generate metadata based on the audio file, wherein the metadata includes transcription characteristics of the audio file; and determine a segmenting interval for the audio file based on the speech recognition features and the metadata.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
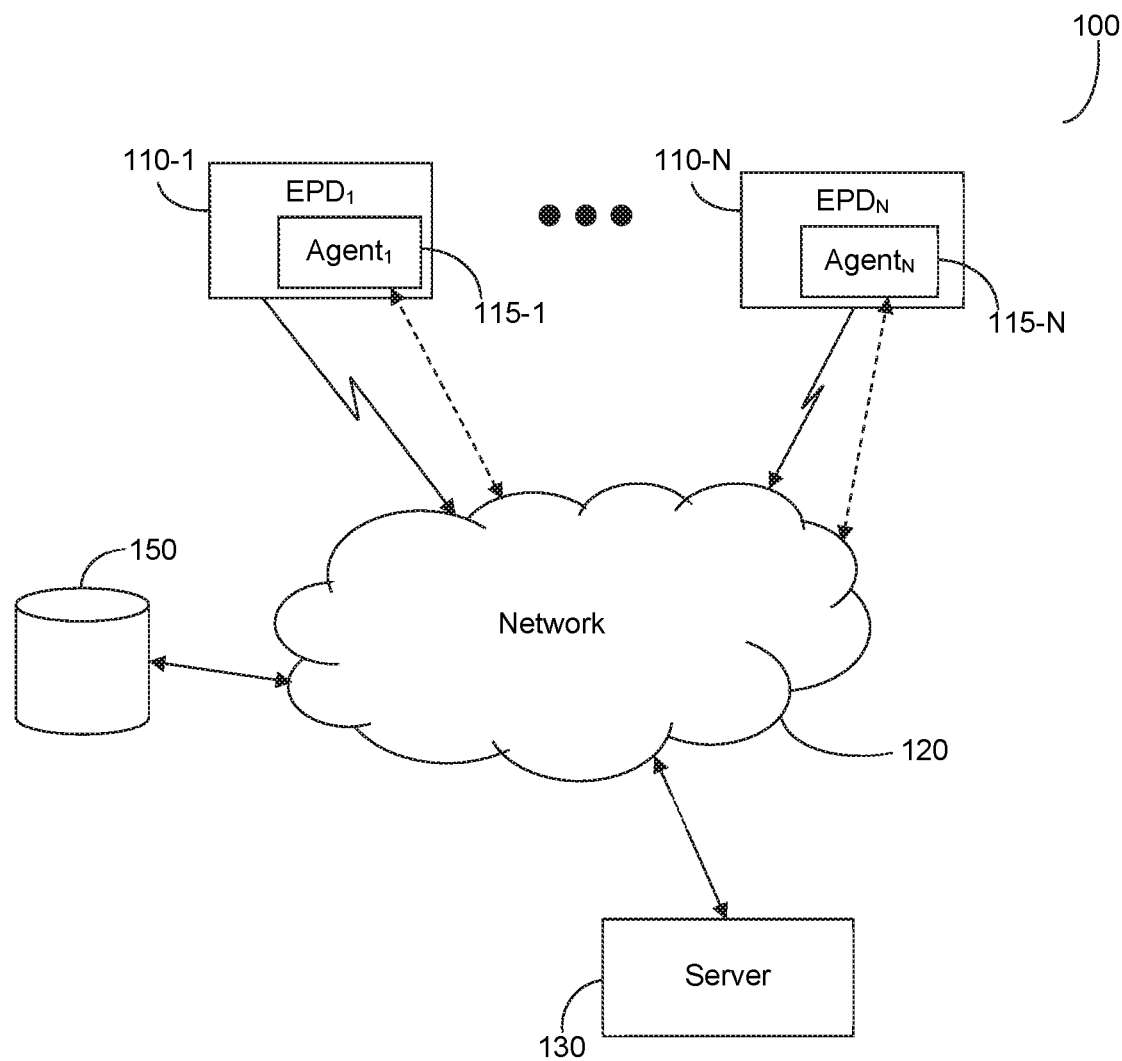
FIG. 1 is a diagram of a system for segmenting audio files for transcription according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and a method for segmenting one or more audio files into multiple segments based on an analysis of the content therein. In an embodiment, an audio file is received by a server and analyzed using one or more speech recognition techniques. Based on the analysis, speech recognition features and metadata related to the audio file is generated. The metadata includes one or more transcription characteristics such as, for example, signal to noise ratio (SNR), accents present within the file, number of active speakers, background noises, and the like. Based on the speech recognition features and the generated metadata, the system is further configured to split the audio file into multiple segments for transcription of the audio file.

It should be noted that based on the generated metadata, certain audio files or audio file segments can be directed toward certain services. As a non-limiting example, upon identifying an audio file as containing confidential information, the pool of eligible candidates for providing the transcription services can be limited to include only those who have been identified as having passed a confidentiality clearance sufficient for the relevant audio file.

FIG. 1 shows an example diagram of a system 100 for segmenting audio files for transcriptions according to an embodiment. A plurality of end point devices (EPD) 110-1 through 110-N (collectively referred hereinafter as end point devices 110 or individually as an end point device 110, merely for simplicity purposes), where N is an integer equal to or greater than 1, are connected to a network 120. The EPDs 110 can be, but are not limited to, smartphones, mobile phones, laptops, tablet computers, wearable computing devices, personal computers (PCs), a combination thereof and the like. The EPDs 110 may be operated by users or entities looking to receive transcription services for audio files as well as by users or entities interested in providing transcription services, e.g., transcription employees or freelancers.

According to an embodiment, each of the EPDs 110-1 through 110-N has an agent 115-1 through 115-N installed therein, (collectively referred hereinafter as agents 115 or individually as an agent 115, merely for simplicity purposes), respectively, where N is an integer equal to or greater than 1. Each of the agents 115 may be implemented as an application program having instructions that may reside in a memory of the respective EPD 110.

The network 120 may include a bus, a local area network (LAN), a wide area network (WAN), a metro area network (MAN), a cellular network, the worldwide web (WWW), the internet, as well as a variety of other communication networks, whether wired or wireless, and any combination thereof, that are configured to enable the transfer of data, for example audio files, between the different elements of the system 100.

A server 130 is further connected to the network 120. The server 130 is configured to receive audio files for transcription assessment and segmenting from one or more EPDs 110. The server 130 typically includes a processing circuitry, such as a processor, and a memory (neither shown in FIG. 1). The memory contains therein instructions that, when executed by the processing circuitry, configures the server 130 to assess and segment an audio file as further described herein.

The system 100 further includes a database 150. The database is configured to store therein information (e.g., metadata) associated with previous audio file assessments generated by the server 130. The database 150 may be connected to the network 120, or connected directly to the server 130 (not shown). The server 130 is configured to access the database 150 in order to compare metadata from a previously analyzed audio file to an audio file currently being analyzed.

The server 130 is configured to analyze a received audio file. The analysis may include one or more deep learning techniques or one or more speech recognition techniques.

According to an embodiment, the analysis may at least be partially based on one or more neural networks extracted from the database 150. For example, neural network may include a system for audio characterization that trains bottleneck features from neural networks, e.g., linear and non-linear audio processing algorithms that may be implemented using neural networks for audio processing. The algorithms may include, for example, decision tree learning, clustering, homomorphic filtering, wideband reducing filtering, and sound wave anti-aliasing algorithms.

The analysis includes identifying speech recognition features of the received audio file, which may include tonal context, linguistic context, and voice activity features of the audio file. In an embodiment, the speech recognition features may further include intensity, Linear Predictive Coding (LPC), Perceptional Linear Predictive Coefficients (PLP), Mel-Frequency Cepstral Coefficients (MFCC), Linear Prediction Cepstral Coefficients (LPCC), Wavelet Based Features and Non-Negative Matrix Factorization features.

Additionally, the analysis may include generating metadata regarding the file, where the metadata may include transcription characteristics, including a signal to noise ratio, the clarity of recording, the number of speakers captured within the audio file, the accents of each speaker, languages spoken by each speaker, background noises, and the like, a combination thereof, and portions thereof. The metadata may be generated using one or more deep learning techniques. According to an embodiment, the process of generating the transcription characteristics comprises identification of all type of noises in the recording, e.g., main speaker(s), other speaker(s), background noises, white noises, etc. A signature is then generated for each characteristic. Volume and clarity for each characteristic are determined based on a match between the generated characteristics.

According to a further embodiment, the transcription characteristics may further include contextual variables associated with the audio file. The contextual variables may include, for example, a topic of the audio file, a source of the audio file, lingual indicators, and the like.

Based on the identified speech recognition features and generated transcription characteristics, the server 130 is configured to segment the audio file into two or more audio file segments. The audio file is segmented at an optimal point, allowing, for example, for a uniform resulting segment without contextual or linguistic interruptions. Such a segment can be more efficiently transcribed. As a non-limiting example, if a first speaker within an audio file is speaking English, and a second speaker within the audio file is speaking French, the audio file may be segmented into a first segment and a second segment, such that the first segment may include only the speech by the first speaker, which can be assigned to a transcription provider capable of English transcription, and the second segment may include only the speech by the second speaker, which can be assigned to a transcription provider capable of French transcription.

In an embodiment, the server 130 is further configured to send the resulting audio file segments to transcription providers, which may include one or more EPDs 110.

Figure 2:
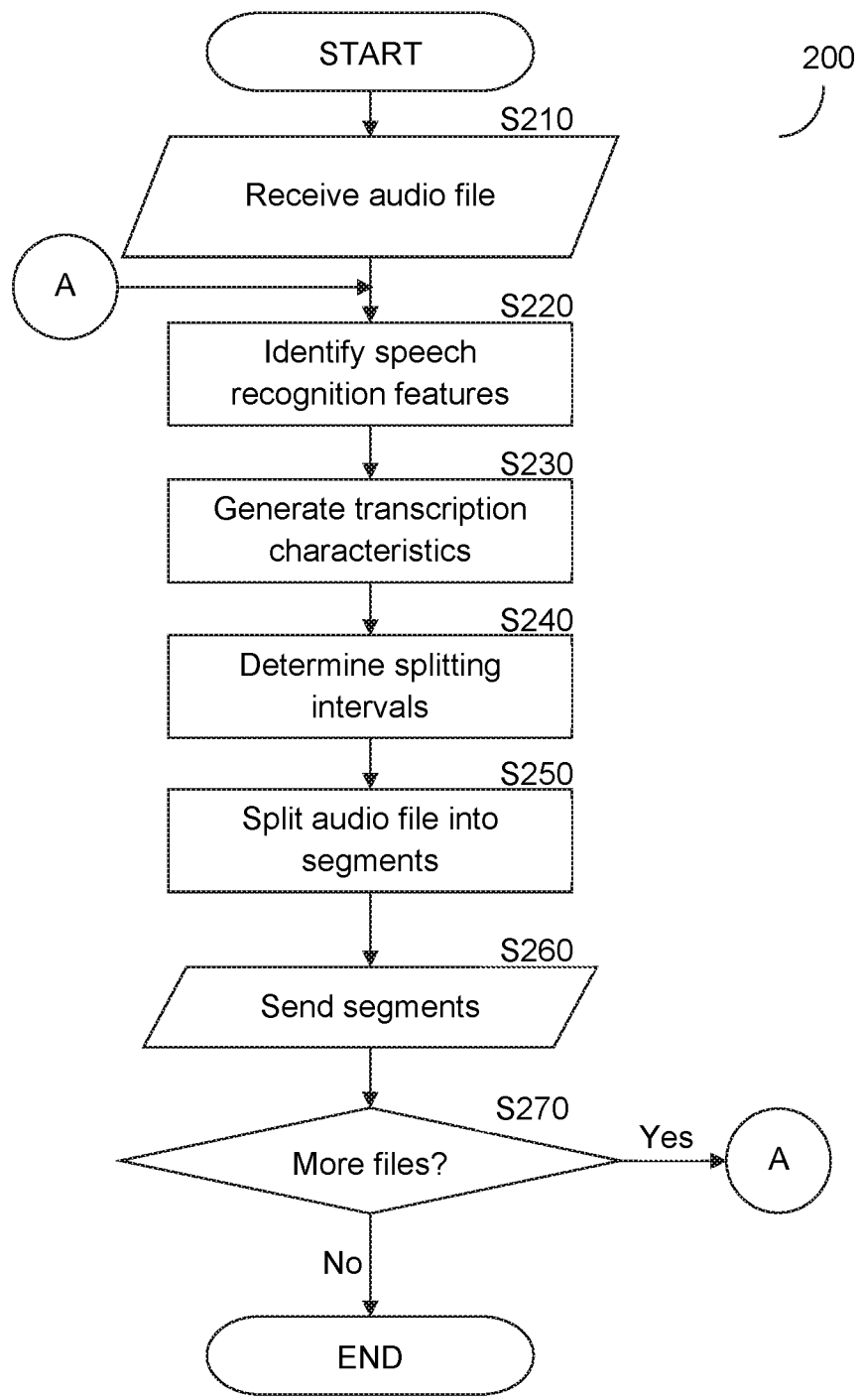
FIG. 2 is a flowchart of a method for segmenting audio files for transcription according to an embodiment.

FIG. 2 is a flowchart 200 of a method for segmenting audio files for transcription according to an embodiment. At S210, an audio file is received for transcription. The audio file may be received over a network, such as the internet, and may include a recording of one or more speakers.

At S220, the audio file is analyzed to identify speech recognition features. The speech recognition features may include tonal context, linguistic context, and voice activity features of the audio file.

At S230, metadata for the audio file is generated, where the metadata at least includes transcription characteristics related to the audio file. The transcription characteristics include a signal to noise ratio, the clarity of recording, the number of speakers captured within the audio file, the accents of each speaker, languages spoken by each speaker, background noises, and the like, a combination thereof, and portions thereof. According to an embodiment, the transcription characteristics may additionally include contextual variables associated with the audio file, which may include a topic of the audio file, a source of the audio file, lingual indicators, and the like.

At S240, based on the identified speech recognition features and generated transcription characteristics, one or more segmenting intervals within the audio file is determined. A segmenting interval is a point within the audio file where it is determined to be an optimal start or end point of an audio file segment. Such a start or end point may include a transition between a first speaker and a second speaker, a shift in recording location, a change in spoken language, and the like.

At S250, the audio file is split into segments according to the determined segmenting intervals. At optional S260, the segments are sent to a receiver, for example, to transcription providers. In an embodiment, the audio file segment is sent to a transcription provider. In an embodiment, the generated metadata may include access information. For example, an audio file may be determined to be confidential. When processing such a file, the segments of the audio file may be restricted to only be sent to transcription providers having a minimum required confidentiality qualification.

In a further embodiment, only the start and end points of the determined segmenting intervals is sent, e.g., the minute and second time within the audio file is sent to a transcription provider. This increases efficiency when the transcription provider possess the audio file, as there is no need to transfer the audio file or segments thereof, and the only information relayed is the point at which to segment the audio file.

At optional S270, it is determined if there are more audio files to be analyzed for segmenting. If so, the process continues at S220; otherwise it ends.

Figure 3:
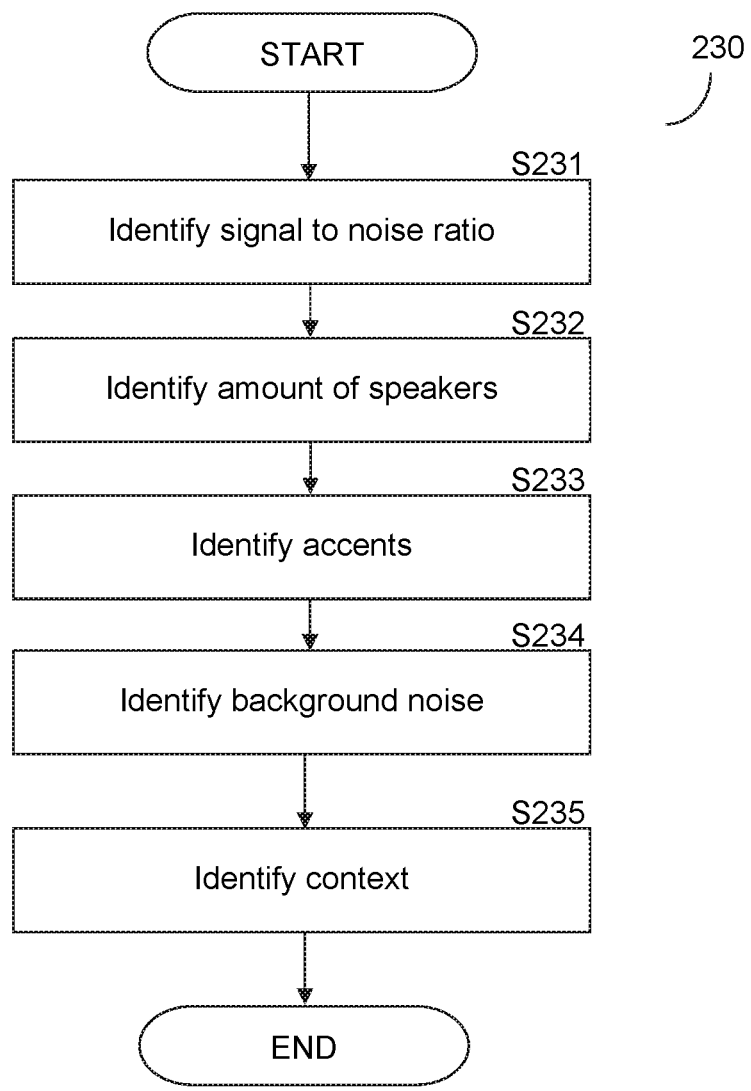
FIG. 3 is a flowchart of a method for the identification of transcription characteristics of an audio file according to an embodiment.

FIG. 3 depicts an example flowchart 300 describing the operation of a method for generating transcription characteristics based on an audio file received according to an embodiment. In S231, when a signal to noise ratio of the audio within the audio file is determined.

Signal-to-noise ratio (SNR) is a measure that compares a level of a desired signal to a level of background noise. It is defined as the ratio of signal power to the noise power, and may be expressed in decibels. The desired signal, e.g., the most prominent voice detected within an audio file, may be identified in real time by comparing the value of the signal power to the noise power. For example, the SNR may be defined as equal to the acoustic intensity of the signal divided by the acoustic intensity of noise. Alternatively, the SNR may be calculated by determining a section of the audio file that contains the desired signal and noise to a section of the audio file that only contains noise. The SNR may be determined by dividing the amplitude of former by the amplitude if the latter.

At S232, the number of speakers in the audio file is identified. The identification may be achieved by generating a signature for each voice determined to be unique within the audio file. At S234, background noise in the audio file is identified. Background noise can include, e.g., white noise present throughout an entire recording, distinct sounds determined to be unwanted (e.g., a doorbell or a phone ringtone), artificial audio artifacts present within the audio file, and the like.

At S233, accents are identified within the audio file, i.e., accents for each speaker based on an associated signature. Example for such accent identification may include phonological GMM-SVM, GMM-UBM, iVectors, and the like.

At optional S235, contextual variables associated with the audio files are identified, wherein the contextual variables include, but are not limited to, a topic of the audio file, source of the audio file, lingual indicators, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for segmenting an audio file at optimal points that allow efficient transcribing, comprising:
analyzing an audio file, wherein the analyzing includes (i) identifying number of speakers in the audio file based on generating a signature for each voice determined to be unique within the audio file, and (ii) identifying accent of each speaker based on at least one of a Gaussian mixture model (GMM), a GMM Support Vector Machine (GMM-SVM) and GMM Universal Background Model (GMM-UBM);

generating metadata based on the audio file, wherein the metadata includes language spoken by each speaker; and segmenting the audio file at optimal points without contextual or linguistic interruptions between segments, based on the number of speakers, the accent of each speaker, and the metadata.

2. The method of claim 1, further comprising identifying that the audio file contains confidential information, limiting the pool of eligible candidates for providing the transcription services to include only those who have been identified as having passed a confidentiality clearance sufficient for the relevant audio file, and selecting at least one candidate from the pool of eligible candidates.

3. The method of claim 1, wherein a first speaker within the audio file is speaking English, a second speaker within the audio file is speaking French, and the audio file is segmented into a first segment and a second segment, such that the first segment includes the speech by the first speaker that is assigned to a first transcription provider capable of English transcription, and the second segment includes the speech by the second speaker that is assigned to a second transcription provider capable of French transcription.

4. The method of claim 1, wherein the analyzing of the audio file further utilizes at least one of the following techniques: tonal context, linguistic context, voice activity, Linear Predictive Coding (LPC), Perceptual Linear Predictive Coefficients (PLP), Mel-Frequency Cepstral Coefficients (MFCC), Linear Prediction Cepstral Coefficients (LPCC), Wavelet Based Features and Non-Negative Matrix Factorization features.

5. The method of claim 1, wherein at least one of the optimal points comprises a transition between a first speaker and a second speaker.

6. The method of claim 5, wherein at least one of the optimal points comprises a shift in recording location.

7. The method of claim 1, wherein at least one of the optimal points comprises a change in spoken language.

8. The method of claim 1, wherein the analyzing the at least one audio file further comprises: employing a deep learning technique, and further comprising forwarding a first segment of the segments to a first transcription provider and forwarding a second segment of the segments to a second transcription provider.

9. The method of claim 8, wherein the deep learning technique includes as least one of: a neural network algorithm, decision tree learning, clustering, homomorphic filtering, wideband reducing filtering, and sound wave anti-aliasing algorithms.

10. A system for segmenting an audio file at optimal points that allow efficient transcribing, comprising:
a processing circuitry; and
a memory, the memory containing instructions that, when executed by the processing circuitry, configure the system to:
analyze an audio file, wherein the analyzing includes (i) identifying number of speakers in the audio file based on generating a signature for each voice determined to be unique within the audio file, and (ii) identifying accent of each speaker based on at least one of a Gaussian mixture model (GMM), a GMM Support Vector Machine (GMM-SVM) and GMM Universal Background Model (GMM-UBM);
generate metadata based on the audio file, wherein the metadata includes language spoken by each speaker; and
segmenting the audio file at optimal points without contextual or linguistic interruptions between segments, based on the number of speakers, the accent of each speaker, and the metadata.

11. The system of claim 10, wherein the system is further configured to identify that the audio file contains confidential information, limit the pool of eligible candidates for providing the transcription services to include only those who have been identified as having passed a confidentiality clearance sufficient for the relevant audio file, and select at least one candidate from the pool of eligible candidates.

12. The system of claim 10, wherein at least one of the optimal points comprises a transition between a first speaker and a second speaker.

13. The system of claim 12, wherein at least one of the optimal points comprises a shift in recording location.

14. The system of claim 10, wherein at least one of the optimal points comprises a change in spoken language.

15. The system of claim 10, wherein the analyzing the at least one audio file further comprises: employ a deep learning technique, and further comprising forwarding a first segment of the segments to a first transcription provider and forwarding a second segment of the segments to a second transcription provider.

16. The system of claim 12, wherein the deep learning technique includes as least one of: a neural network algorithm, decision tree learning, clustering, homomorphic filtering, wideband reducing filtering, and sound wave anti-aliasing algorithms.

* * * * *